US00RE35364E

United States Patent [19]

Heitschel et al.

[11] E Patent Number: Re. 35,364

[45] Reissued Date of Patent: Oct. 29, 1996

[54] CODING SYSTEM FOR MULTIPLE TRANSMITTERS AND A SINGLE RECEIVER FOR A GARAGE DOOR OPENER

[75] Inventors: Carl Heitschel, Downers Grove; Colin Willmott, Buffalo Grove; Wayne Schindler, Lisle, all of Ill.

[73] Assignee: The Chamberlain Group, Inc., Elmhurst, Ill.

[21] Appl. No.: 425,724

[22] Filed: Apr. 20, 1995

Related U.S. Patent Documents

Reissue of:

[64] Patent No.: 4,750,118
Issued: Jun. 7, 1988
Appl. No.: 792,661
Filed: Oct. 29, 1985

U.S. Applications:

[63] Continuation of Ser. No. 87,142, Jul. 2, 1993, abandoned, which is a continuation of Ser. No. 715,006, Jun. 13, 1991, abandoned, which is a continuation of Ser. No. 398,379, Aug. 24, 1989, abandoned.

[51] Int. Cl.[6] ..... G06F 19/00; G08C 19/00; E05F 15/20

[52] U.S. Cl. ..... 364/400; 49/25; 340/825.69; 340/825.73

[58] Field of Search ..... 364/130, 400, 364/167.01, 825.04, 825.3, 825.31, 825.44, 825.56, 825.69, 825.71, 825.72, 825.73, 825.74, 825.75, 825.76, 539, 542, 543; 49/25, 28, 31, 70, 324; 318/16, 262–266, 282, 466–468; 361/171, 172; 455/186.1, 186.2

[56] References Cited

U.S. PATENT DOCUMENTS

| | | | |
|---|---|---|---|
| Re. 29,525 | 1/1978 | Willmott | 325/37 |
| 3,911,397 | 10/1975 | Freeny, Jr. | 340/147 MD |
| 4,037,201 | 7/1977 | Willmott | 340/167 R |
| 4,081,747 | 3/1978 | Meyerle | 325/37 |
| 4,119,896 | 10/1978 | Estes, III et al. | 318/266 |
| 4,130,738 | 12/1978 | Sandstedt | 179/90 B |
| 4,178,549 | 12/1979 | Ledenbach et al. | 325/38 R |
| 4,263,536 | 4/1981 | Lee et al. | 318/266 |

(List continued on next page.)

FOREIGN PATENT DOCUMENTS

| | | |
|---|---|---|
| 0099762A1 | 2/1984 | European Pat. Off. . |
| 0143309A2 | 6/1985 | European Pat. Off. . |
| 0212050A2 | 3/1987 | European Pat. Off. . |
| 0319781A2 | 6/1989 | European Pat. Off. . |
| 0401673A1 | 12/1990 | European Pat. Off. . |
| 0561361A1 | 9/1993 | European Pat. Off. . |
| 0563517A1 | 10/1993 | European Pat. Off. . |
| 2746532A1 | 4/1979 | Germany . |
| 2856337 | 7/1980 | Germany . |
| 2939589A1 | 4/1981 | Germany . |
| 2941394A1 | 4/1981 | Germany . |
| 55-114771 | 4/1980 | Japan . |
| 59-80872 | 5/1984 | Japan . |
| 1423126 | 9/1974 | United Kingdom . |

OTHER PUBLICATIONS

"Garagentorantrieb mit Funkfernsteuerung," by Torsten Meyer-Staufenbiel, pp. 115–117, dated 1975.

Alltronik Opposition Brief of Jul. 8, 1990, corresponding to German Patent No. 36 25 555.

Dorma Opposition Brief of Aug. 8, 1990 of corresponding German Patent No. 36 25 555.

*Primary Examiner*—Joseph Ruggiero
*Attorney, Agent, or Firm*—Fitch, Even, Tabin & Flannery

[57] ABSTRACT

The present invention comprises a system for remote control of garage doors and other devices wherein an extremely large number of codes are available for remote transmitters for operating the garage operator and wherein each transmitter has its own unique and permanent nonuser changeable code. The receiver at the garage door operator is capable of storing and remembering a number of different codes corresponding to different transmitters such that the receiver can be programmed so as to actuated by more than one transmitter code thus allowing two or more transmitters to actuate the same garage door operator and wherein the receiver stores the valid codes for the different transmitters.

8 Claims, 3 Drawing Sheets

U.S. PATENT DOCUMENTS

| | | | |
|---|---|---|---|
| 4,291,411 | 9/1981 | Müller et al. | 455/88 |
| 4,305,060 | 12/1981 | Apple et al. | 340/825.65 |
| 4,322,855 | 3/1982 | Mogi et al. | 455/151 |
| 4,328,540 | 5/1982 | Matsuoka et al. | 364/167 |
| 4,385,296 | 5/1983 | Tsubaki et al. | 340/825.72 |
| 4,418,333 | 11/1983 | Schwarzbach et al. | 340/310 A |
| 4,422,071 | 12/1983 | DeGraff | 340/825.44 |
| 4,454,509 | 6/1984 | Buennagel et al. | 340/825.69 |
| 4,464,651 | 8/1984 | Duhame | 340/521 |
| 4,491,774 | 1/1985 | Schmitz | 318/282 |
| 4,509,093 | 4/1985 | Stellberger | 361/172 |
| 4,529,980 | 7/1985 | Liotine et al. | 340/825.52 |
| 4,535,333 | 8/1985 | Twardowski | 340/825.69 |
| 4,550,311 | 10/1985 | Galloway et al. | 340/531 |
| 4,581,606 | 4/1986 | Mallory | 340/539 |
| 4,596,985 | 6/1986 | Bongard et al. | 340/825.69 |
| 4,602,357 | 7/1986 | Yang et al. | 367/93 |
| 4,633,247 | 12/1986 | Hegeler | 340/825.69 |
| 4,638,433 | 1/1987 | Schindler | 364/400 |
| 4,652,860 | 3/1987 | Weishaupt et al. | 340/539 |
| 4,665,397 | 5/1987 | Pinnow | 340/825.56 |
| 4,755,792 | 7/1988 | Pezzolo et al. | 340/538 |
| 4,758,835 | 7/1988 | Rathmann et al. | 340/825.31 |
| 4,866,434 | 9/1989 | Keenan | 340/825.72 |
| 4,878,052 | 10/1989 | Schulze | 340/825.69 |
| 4,912,463 | 3/1990 | Li | 340/825.69 |
| 4,988,992 | 1/1991 | Heitschel et al. | 340/825.69 |

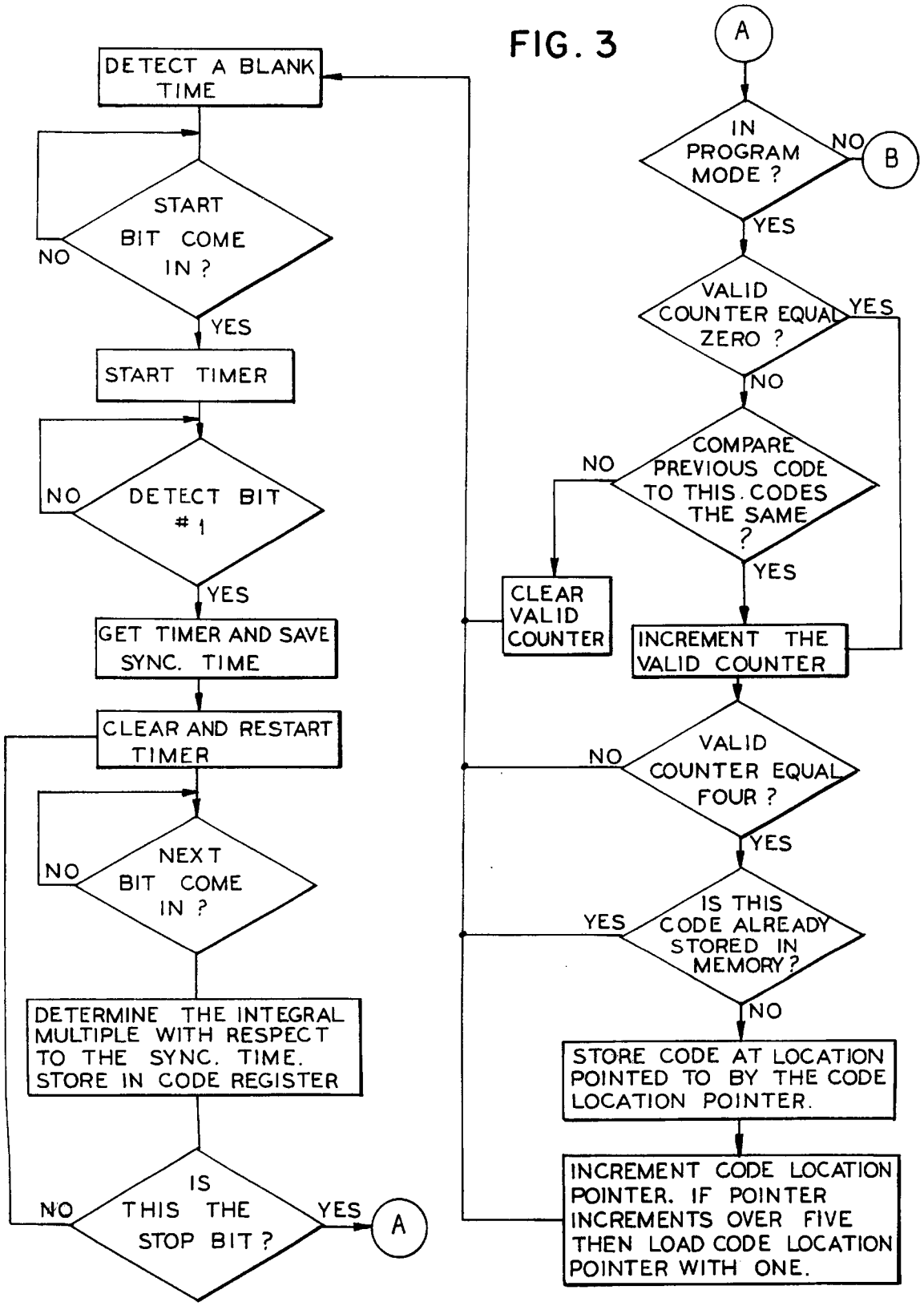
FIG. 3
DETECT A BLANK TIME
START BIT COME IN ?
NO
YES
START TIMER
DETECT BIT #1
NO
YES
GET TIMER AND SAVE SYNC. TIME
CLEAR AND RESTART TIMER
NEXT BIT COME IN ?
NO
DETERMINE THE INTEGRAL MULTIPLE WITH RESPECT TO THE SYNC. TIME. STORE IN CODE REGISTER
IS THIS THE STOP BIT ?
NO
YES
A
A
IN PROGRAM MODE ?
NO
B
YES
VALID COUNTER EQUAL ZERO ?
YES
NO
COMPARE PREVIOUS CODE TO THIS. CODES THE SAME ?
NO
YES
CLEAR VALID COUNTER
INCREMENT THE VALID COUNTER
VALID COUNTER EQUAL FOUR ?
NO
YES
IS THIS CODE ALREADY STORED IN MEMORY ?
YES
NO
STORE CODE AT LOCATION POINTED TO BY THE CODE LOCATION POINTER.
INCREMENT CODE LOCATION POINTER. IF POINTER INCREMENTS OVER FIVE THEN LOAD CODE LOCATION POINTER WITH ONE.

CODING SYSTEM FOR MULTIPLE TRANSMITTERS AND A SINGLE RECEIVER FOR A GARAGE DOOR OPENER

Matter enclosed in heavy brackets [ ] appears in the original patent but forms no part of this reissue specification; matter printed in italics indicates the additions made by reissue.

*This application is a continuation of application Ser. No. 087,142 filed Jul. 2, 1993, abandoned, which is a continuation of application Ser. No. 715,006, filed Jun. 13, 1991, abandoned, which is a continuation, of application Ser. No. 398,379 filed Aug. 24, 1989 abandoned.*

CROSS-REFERENCES TO RELATED APPLICATIONS

This application comprises an improvement on application Ser. No. 615,339, filed May 30, 1984, U.S. Pat. No. 4,638,433, in which the inventor is Wayne R. Schindler assigned to the assignee of the present application.

BACKGROUND OF THE INVENTION

1. Field of the Invention

This invention relates in general to garage door operators and in particular to a novel garage door operator wherein the receiver can be energized by two or more transmitted codes which are stored in the receiver.

2. Description of the Prior Art

Garage door operators of the prior art used transmitters in which the code can be changed by various methods as, for example, by moving two position switches to change the code. Such systems have also used code changing switches in the receiver so that the receivers can be set to correspond to the selected transmitter code.

It has also been known to use fixed frequency transmitters and fixed frequency receivers such that if the transmitted frequency matches the receiver frequency the receiver will respond.

SUMMARY OF THE INVENTION

It is an object of the present invention to provide a plurality of transmitters wherein each transmitter has its own unique and permanent non-user changeable code and wherein the receiver can be placed into a program mode wherein it will receive and store two or more codes corresponding to two different transmitters. The number of codes which can be stored in transmitters can be extremely high as, for example, greater than one million codes. Thus, the invention makes it possible to eliminate the requirements for code selection switches in the transmitters.

In the present invention the decoder module in the receiver will be capable of learning several different transmitted codes which will eliminate code switches in the receiver and also provides for multiple transmitters for actuating the garage opener.

The communication link can be various system such as radio frequency, light, wires, etc.

The invention makes it very easy for the user to operate the system and more secured code systems are available due to the higher number of available codes.

An encoded signal will be utilized wherein a pulse and blank time comprises a sync time base and different link pulses such as 1, 2, 3 or 4 milliseconds can be selected so as to provide different codings. Each datum can be 1, 2, 3 or 4 times the length of the sync pulse. The timing is from the rising edge to rising edges of the pulse and with ten data bits the number of codes can be in excess of one million codes.

In the invention, each transmitter encoder will contain a chip which contains a unique code and the receiver will be able to memorize two or more as, for example, five different transmitter codes. This eliminates the need to have coding switches in either the transmitter or receiver. This eliminates the requirement that the user set the code switches so they match since the code switches are eliminated.

In the invention, during an operate mode, a receiver code must match an already programmed code four times in order to operate the garage door. This match is referred to as a valid code. Each valid code can be separated by up to two error codes and still have the output indicated as accurate.

In the program mode a code must be received four times in a row in order to be permanently stored in the receiver. Any error code will reset the valid code counter.

The advantage of the coding scheme are:

1. Higher peak power without exceeding the FCC rules which gives longer transmitter range.

2. Eliminate code switches in the transmitter and receiver making it easier for a customer to install and operate his garage door operator.

3. Customers having more than one transmitter will not have to match codes.

4. More secure codes due to the higher number of combinations which are available. Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure and in which:

BRIEF DESCRIPTION OF THE DRAWINGS

FIG. 3 comprises a flow diagram;

DESCRIPTION OF THE PREFERRED EMBODIMENTS

Figure 1:
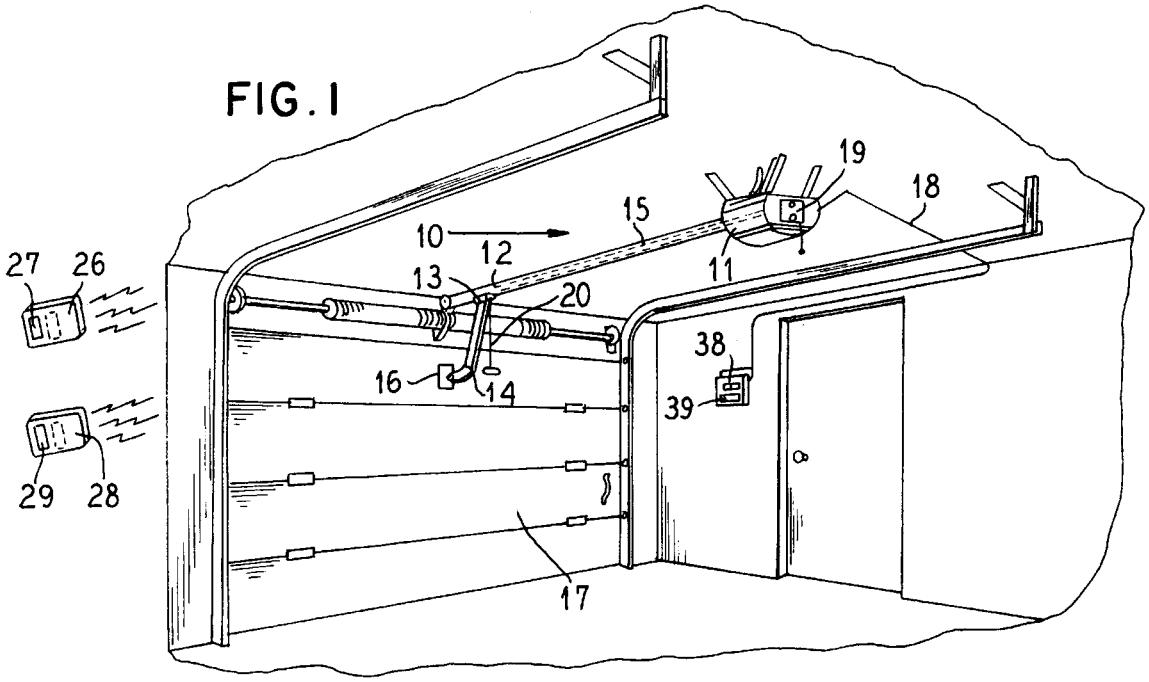
FIG. 1 is a perspective view illustrating a garage door operator.

FIG. 1 illustrates a garage door operator 10 mounted to the ceiling of a garage and connected to operate a door 17. Garage door operator 10 has a head unit 11 which is supported from the ceiling which includes a motor which drives a suitable chain to which a trolley 13 is attached so that it moves along a rail 12. The trolley 13 has a release cord 20 and pivotally carries a lever arm 14 which is attached to a bracket 16 mounted to the door so as to raise and open it by pulling it along conventional rails.

The header unit 11 includes a receiver and operating mechanism and can be actuated from a control unit 38 which has a operate switch 39.

The garage door operator can also be operated by the transmitters 26 and 28 which have operate transmit buttons 27 and 29, respectively.

Figure 2:
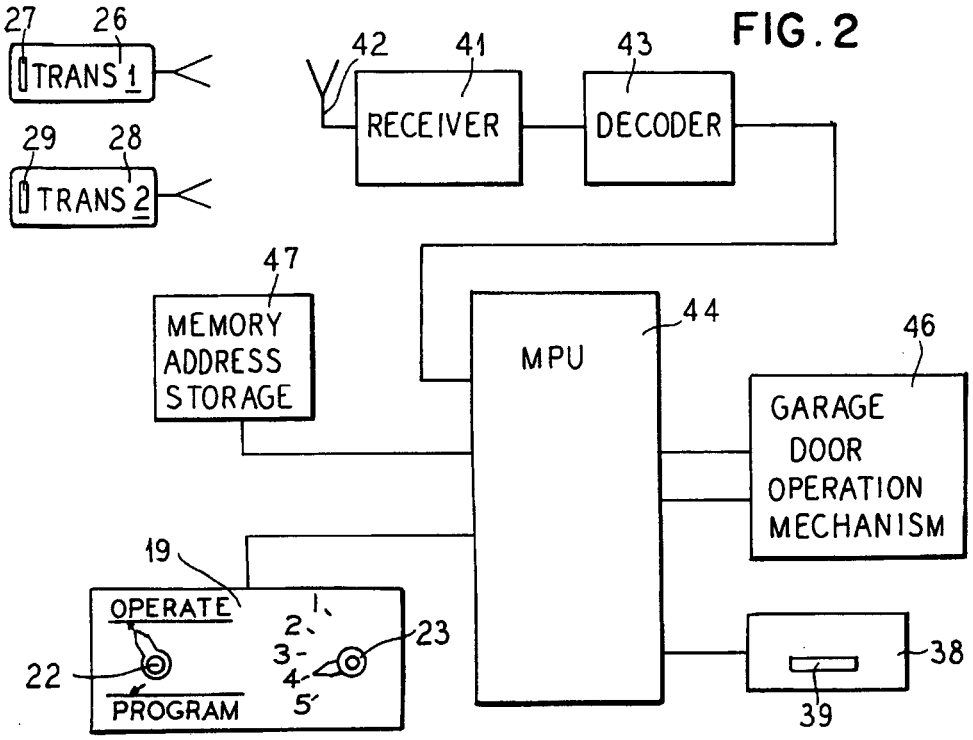
FIG. 2 illustrates in block form the invention.

As illustrated in FIG. 2 the garage door operator includes a receiver 41 which has a suitable antenna 42 for receiving radio frequency transmissions from the transmitters 26 and 28 and supplies an input to a decoder 43 which provides an output to a microprocessor unit 44. The microprocessor unit 44 is connected to a garage door operator mechanism 46 which includes the motor which drives the chain 15 to move the door 17 in a conventional manner. The control 38 is connected to the microprocessor 44. A pair of switches 22 and 23 are mounted on a switch unit 19 connected to the unit 11 and also to the microprocessor 44. The switch 22 is a two position switch that can be moved between the operate and program positions to establish the "operate" and "program" modes. The switch 23 can be moved to a number of selected positions indicated by the 1 through 5 so as to allow the particular code of a number of different transmitters to be stored in the receiver so that the receiver will respond to such codes.

Figure 5:
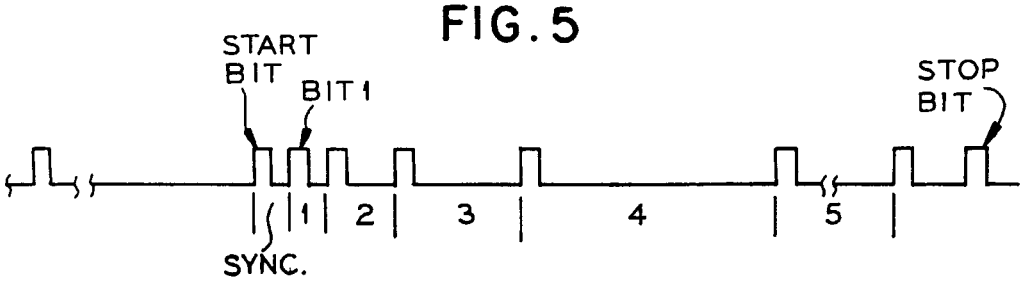
FIG. 5 illustrates the coding scheme.

In the illustrated embodiment, the receiving unit can respond to up to five different transmitters which have five different transmitting codes. FIG. 5 illustrates the code utilized in which the bit times are nominally 0.5 milliseconds for example. The data times are nominally 1, 2, 3 or 4 milliseconds.

The sync pulse is a unit measure of time. Each datum is measured with respect to the sync pulse and each datum can be 1, 2, 3 or 4 times the length of the sync pulse. The timing is from the rising edge to rising edge of adjacent pulses. Using 10 data bits the number of codes which is available is in excess of one million codes.

In the invention, each transmitter such as transmitters 26 and 28 will have a unique code which is determined by the encoder chip contained in the transmitter. The receiver unit will be able to memorize and store a number of different codes as, for example, five different transmitter codes which eliminates the need of coding switches in either the transmitter or receiver which are used in the prior art. This also eliminates the requirement that the user match the transmitter and receiver code switches.

When the garage door operator is initially installed, the switch 22 is moved to the program mode and the energize button 27 of the first transmitter 26 is depressed so that the unique code of the transmitter 26 is transmitted. This is received by the receiver 41 and decoded by the decoder 43 and supplied to the microprocessor unit 44. The switch 23 is placed in the first position, and with the switch 22 in the program mode the code of the transmitter 26 will be supplied to the memory address storage 47 and stored therein. Then if the switch 22 is moved to the operate mode and the transmitter 26 energized by depressing the transmit switch 27, the receiver 41, decoder and the microprocessor 44 will compare the received code with the code of the transmitter 26 stored in the first memory location in the memory address storage 47 and since the stored memory address for the transmitter 26 coincides with the transmitted code of the transmitter 26 the microprocessor 44 will energize the garage door operation mechanism 46 to open or close the door.

In order to store the code of the second transmitter 28 the switch 22 is moved again to the program mode and the switch 23 to the second position and the transmitter 28 is energized by depressing its transmit switch 29. This causes the receiver 41 and decoder 43 to decode the transmitted signal and supply it to the microprocessor 44 which then supplies the coded signal of the transmitter 28 to the memory address storage 47 where it is stored in a second address storage location. Then the switch 22 is moved to the operate position and when either of the transmitters 26 and 28 are energized, the receiver 41 decoder 43 and microprocessor 44 will energize the garage door operation mechanism 46 to cause the door to either move up or down depending upon its initial position. Thus, the codes of the transmitters 26 and 28 are transmitted and stored in the memory address storage 47 during the program mode after which the garage door operation mechanism will respond to either of the transmitters 26 and 28. Any desired number of transmitters can be programmed to operate the garage door mechanism as, for example, up to five transmitters can be programmed into the memory address storage 47 by using the program switch 22 and the selector switch 23.

This invention eliminates the requirement that binary switches be set in the transmitter or receiver as is done in systems of the prior art to establish a code to which the receiver will respond and the invention also allows a garage door operator to respond to a number of different transmitters because the specific codes of a number of the transmitters is stored and retained in the memory address storage 47 of this unit.

Figure 4:
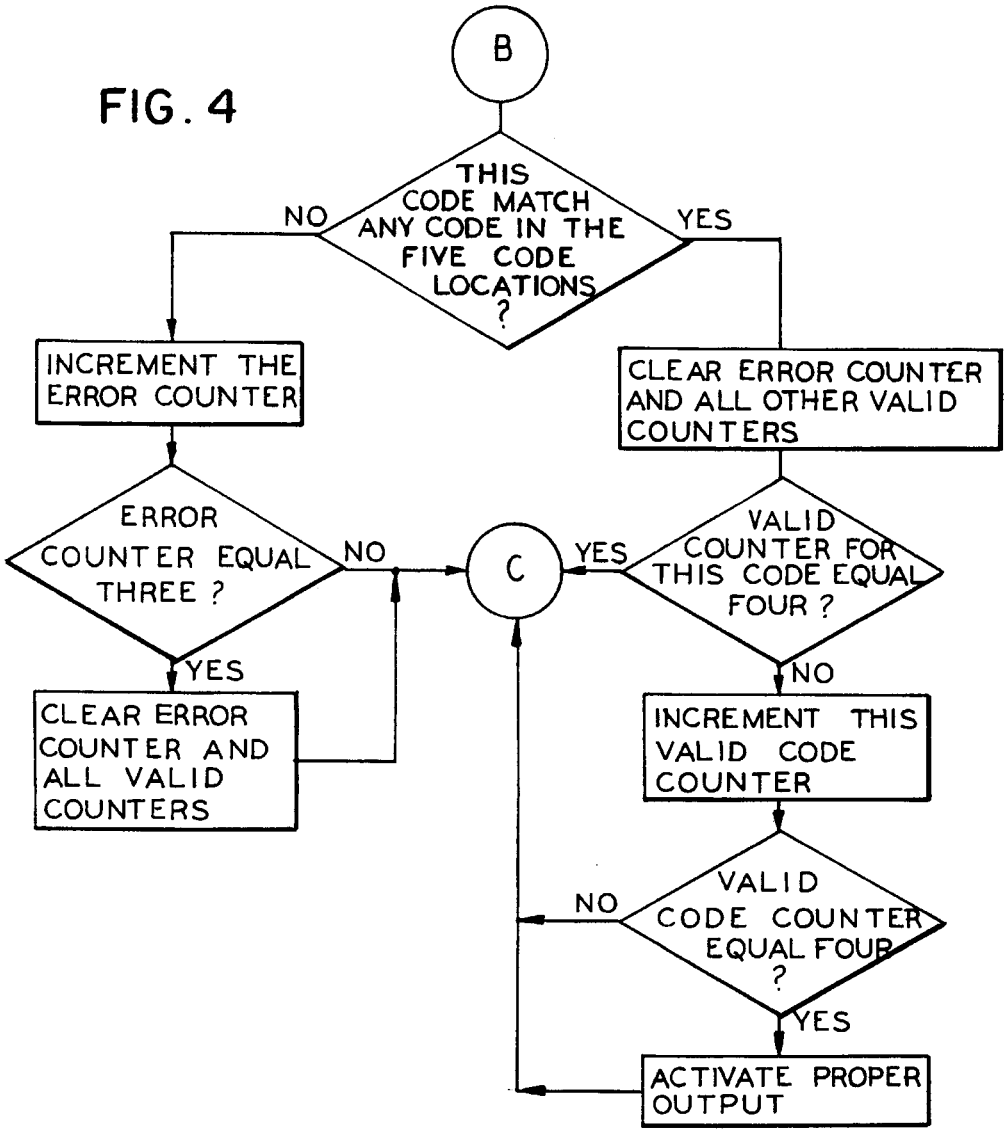
FIG. 4 is a continuation of the flow diagram.

FIGS. 3 and 4 comprise the flow chart which describe both the operate and program modes of the invention. Basically, in the operate mode, a received code must match a program which has already been programmed and for four times so as to operate the garage door. This match is referred to as a valid code in the flow chart. Each valid code can be separated by up to two error codes and still have the output actuate. For example, a code of valid-error-error-valid-valid-valid would actuate the door. On the other hand, a code of valid-valid-valid-error-error-error-valid would not actuate the door.

In the program mode a code must be received four times in a row in order to be permanently stored. Any error code will reset the valid code counter.

with reference to the flow diagrams of FIGS. 3 and 4 if it be assumed initially that the switch 22 is in the operate position an incoming signal will be supplied to terminal A in FIG. 3 and an output will be supplied to terminal B which indicates that the switch 22 is not in the program mode but in the operate mode. Terminal B is illustrated in FIG. 4 and the microprocessor compares the incoming code with any codes in the five code locations stored in the memory address storage 47. If these codes match then the error counter is cleared and all other valid counters. If the valid counter receives the code four times than output is supplied to the terminal C which operates the garage door operator. If the valid counter for the code equals less than 4, then the valid code counter is incremented until the valid code counter does not equal 4 which actuates the proper output. Relative to FIG. 4 if the input code does not match any of the five stored codes, then the error counter is incremented and when the error counter equal 3 the error counter is cleared and all valid counters are cleared.

If the switch 22 is in the program mode as shown in FIG. 3 when the incoming signal from a transmitter is received, the flow diagram is followed so as to store the new incoming program in the code location pointed to by the code location pointer 23. It is to be noted that up to five addresses can be stored in the system of the invention.

It is seen that the present invention allows a receiving system to respond to one of a plurality of transmitters which have different unique codes which can be stored in the receiver during a program mode. Each time the "program mode switch" 22 is moved to the program position, a different storage area as determined by the switch 23 can be connected so that the new transmitter code would be stored in that address. After all of the address storage capacity have been used additional codes would erase all old codes in the memory address storage before storing a new one.

Although the invention has been described with respect to preferred embodiments, it is not to be so limited as changes and modifications may be made which are within the full intended scope as defined by the appended claims.

We claim as our invention:

1. A garage door operator for a garage door comprising, a garage door operation mechanism with an output shaft connected to said garage door to open and close it, a radio receiver, a decoder connected to receive the output of said radio receiver, a microprocessor connected to receive the output of said decoder and to said garage door operation mechanism to energize it, a switch moveable between program and operate positions connected to said microprocessor to place said microprocessor in the operate or program mode, a memory means for storing a plurality of addresses connected to said microprocessor when said switch is in the program position, a memory selection switch connected to said microprocessor, a plurality of radio transmitters with different codes, said memory selection switch setable in a first position at a time when a first one of said radio transmitters is energized so that the code of said first transmitter will be stored in said memory means and said memory selection switch set in a second position at a time when a second one of said radio transmitters is energized so that the code of said second transmitter will be stored in said memory means, and said microprocessor placed in the operate mode when said switch is in the operate position so that either or both of said first and second radio transmitters when energized cause said microprocessor to energize said garage door operator mechanism.

2. A garage door operator for a garage door according to claim 1 wherein said first and second radio transmitters when energized radiate coded signals and said microprocessor receives and compares coded signals from said first and second transmitters with coded signals from said first and second transmitters with coded signals stored in said memory means and said microprocessor produces a garage door operate signal if the received transmitted signal and any one of said coded signals stored in said memory means match.

3. A garage door operator according to claim 2 wherein said memory selection switch has "n" positions where "n" is an integer and the codes of "n" transmitters can be stored in said memory means when said switch is in the program mode.

4. A garage door operator according to claim 3 wherein the code stored in said memory means can be changed by placing said switch in the program mode and one of said plurality of transmitters is energized which has a code which differs from the code previously stored in said memory means.

*5. An operator for controlling operation of equipment comprising: a radio receiver, a decoder connected to receive the output of said radio receiver, a microprocessor connected to receive the output of said decoder and to said equipment to energize it, first switch means for selection between program and operate positions connected to said microprocessor to place said microprocessor in the operate or the program mode, a memory means for storing a plurality of addresses connected to said microprocessor when said first switch means is in the program position, a memory selection second switch means connected to said microprocessor, a plurality of radio transmitters with different codes, said memory selection second switch means being adapted to select a first position at a time when a first one of said radio transmitters is energized so that the code of said first transmitter will be stored in said memory means and said memory selection second switch means being adapted to select a second position at a time when a second one of said radio transmitters is energized so that the code of said second transmitter will be stored in said memory means, and said microprocessor placed in the operate mode when said first switch means is in the operate position so that either or both of said first and second radio transmitters, when energized cause said microprocessor to energize said equipment.*

*6. An operator according to claim 5 wherein said first and second radio transmitters when energized radiate coded signals and said microprocessor receives and compares coded signals from said first and second transmitters with coded signals stored in said memory means and said microprocessor produces an operate signal if the received transmitted signal and any one of said coded signals stored in said memory means match.*

*7. An operator according to claim 6 wherein said second switch means, has "n" positions where "n" is an integer and the codes of "n" transmitters can be stored in said memory means when said first switch means is in the program mode.*

*8. An operator according to claim 7 wherein the code stored in said memory means can be changed by placing said first switch means in the program mode and one of said plurality of transmitters is energized which has a code which differs from the code previously stored in said memory means.*

* * * * *

UNITED STATES PATENT AND TRADEMARK OFFICE

CERTIFICATE OF CORRECTION

PATENT NO. : RE 35,364
DATED : October 29, 1996
INVENTOR(S) : Carl Heitschel, Colin Willmott, Wayne Schindler It is certified that error appears in the above-indentified patent and that said Letters Patent is hereby corrected as shown below:

Column 4, line 38, change "with" to --With--.

Column 4, line 51, delete "not".

Column 4, line 51, change "equal" to --equals--.

Column 4, line 48, change "than" to --then--.

Column 4, line 61, delete "23".

Signed and Sealed this

Twenty-fifth Day of March, 1997

*Attest:*

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : RE 35,364

DATED : October 29, 1996

INVENTOR(S) : Heitschel et al.

It is certified that error appears in the above-indentified patent and that said Letters Patent is hereby corrected as shown below:

Column 5, line 19, after "or" insert --the--.

Column 5, line 28, change "set" to --setable--.

Column 5, line 40, after "second transmitters" delete "with coded signals from said first and second transmitters" (first occurrence).

Signed and Sealed this

Twenty-first Day of April, 1998

Bruce Lehman

*Attest:*

BRUCE LEHMAN

*Attesting Officer*

*Commissioner of Patents and Trademarks*